United States Patent
Hegge et al.

(10) Patent No.: US 12,435,429 B2
(45) Date of Patent: Oct. 7, 2025

(54) ELECTRICALLY CONDUCTIVE NANOFIBERS FOR POLYMER MEMBRANE-BASED ELECTROLYSIS

(71) Applicant: Hahn-Schickard-Gesellschaft für Angewandte Forschung e. V., Villingen-Schwenningen (DE)

(72) Inventors: Friedemann Hegge, Freiburg (DE); Matthias Breitwieser, Freiburg (DE); Florian Lombeck, Freiburg (DE); Severin Vierrath, Freiburg (DE)

(73) Assignee: Hahn-Schickard-Gesellschaft für Angewandte Forschung e. V., Villingen-Schwenningen (DE)

( * ) Notice: Subject to any disclaimer, the term of this patent is extended or adjusted under 35 U.S.C. 154(b) by 240 days.

(21) Appl. No.: 17/596,260

(22) PCT Filed: Jun. 8, 2020

(86) PCT No.: PCT/EP2020/065814
§ 371 (c)(1),
(2) Date: Dec. 6, 2021

(87) PCT Pub. No.: WO2020/245454
PCT Pub. Date: Dec. 10, 2020

(65) Prior Publication Data
US 2022/0307141 A1   Sep. 29, 2022

(30) Foreign Application Priority Data

Jun. 7, 2019 (DE) .................... 10 2019 115 469.3
Sep. 2, 2019 (EP) .................................... 19194885

(51) Int. Cl.
*C25B 1/04* (2021.01)
*C25B 5/00* (2006.01)
(Continued)

(52) U.S. Cl.
CPC .................. *C25B 1/04* (2013.01); *C25B 9/19* (2021.01); *C25B 9/23* (2021.01); *C25B 11/032* (2021.01);
(Continued)

(58) Field of Classification Search
CPC ...... C25B 11/03; C25B 11/031; C25B 11/032
See application file for complete search history.

(56) References Cited

U.S. PATENT DOCUMENTS

| 11,033,888 B2 * | 6/2021 | Liu ........................ B01J 37/04 |
| 2004/0045816 A1 * | 3/2004 | Masel ................. H01M 4/8652 |
| | | 502/182 |

(Continued)

FOREIGN PATENT DOCUMENTS

| CN | 102656730 A | 9/2012 |
| KR | 20100005507 A * | 1/2010 |

(Continued)

OTHER PUBLICATIONS

Machine translation of KR20100005507 of Kim et al (Year: 2010).*

(Continued)

*Primary Examiner* — Brian W Cohen
(74) *Attorney, Agent, or Firm* — Knobbe, Martens, Olson & Bear, LLP

(57) ABSTRACT

The invention preferably relates to an electrolytic cell for generating hydrogen and oxygen with a layer system comprising at least one pair of catalytically active layers between which a polymer membrane is arranged, wherein the layer system comprises electrically conductive ceramic or metallic nanofibers. In particular, the layer system comprises a pair of catalytically active layers, as well as transport layers close to the anode and/or close to the cathode, wherein the pair of catalytically active layers comprises catalytically active nanoparticles, and wherein, in order to increase (Continued)

Figure 1:
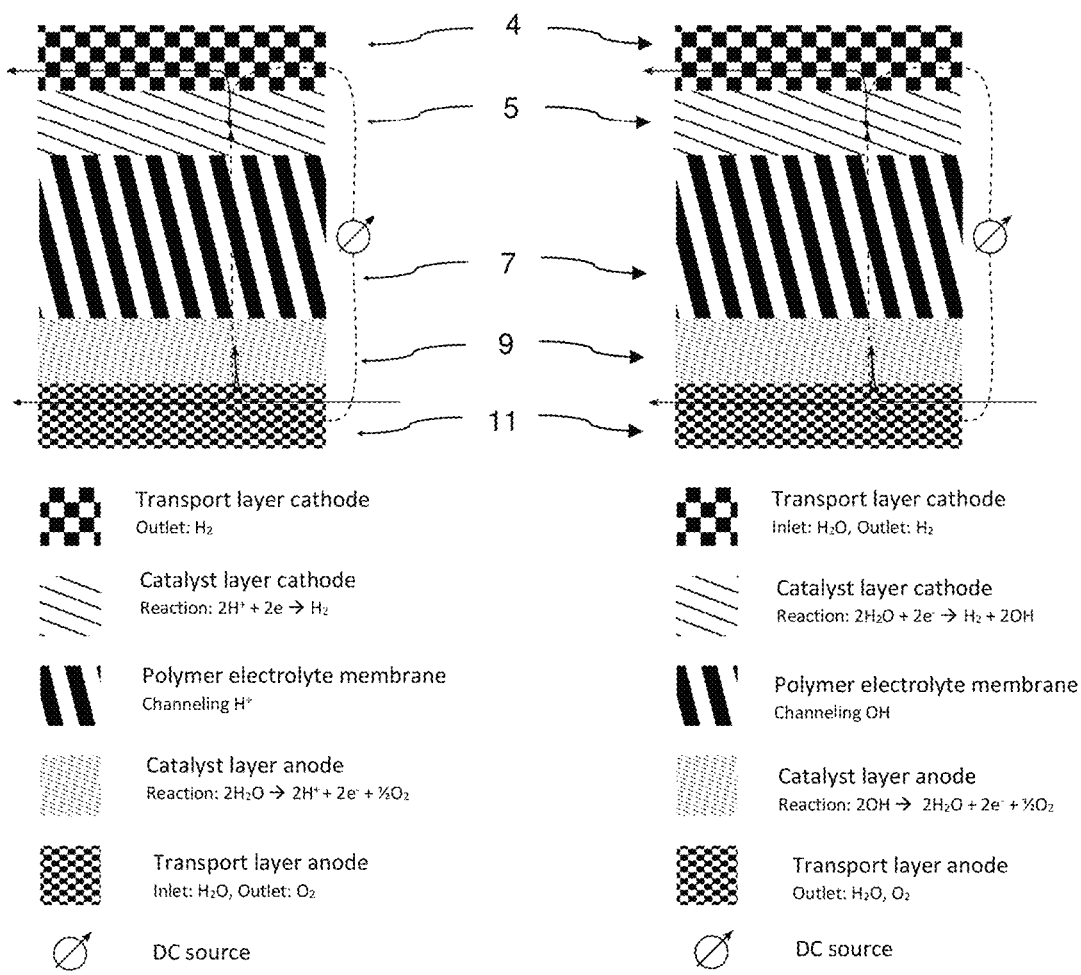

in-plane conductivity or connectivity of the catalytically active nanoparticles, an intermediate layer comprising ceramic or metallic nanofibers is present between one of the catalytically active layers and one of the transport layers, or metallic or ceramic nanofibers are present within one of the catalytically active layers in addition to the catalytically active nanoparticles. The nanofibers can themselves be catalytically active or catalytically inactive.

13 Claims, 7 Drawing Sheets

(51) Int. Cl.
| | |
|---|---|
| C25B 9/19 | (2021.01) |
| C25B 9/23 | (2021.01) |
| C25B 11/032 | (2021.01) |
| C25B 11/053 | (2021.01) |
| C25B 11/091 | (2021.01) |
| C25B 13/07 | (2021.01) |
| C25B 13/08 | (2006.01) |

(52) U.S. Cl.
CPC .......... *C25B 11/053* (2021.01); *C25B 11/091* (2021.01); *C25B 13/07* (2021.01); *C25B 13/08* (2013.01)

(56) References Cited

U.S. PATENT DOCUMENTS

| | | |
|---|---|---|
| 2006/0078784 A1 | 4/2006 | Liu et al. |
| 2008/0280169 A1* | 11/2008 | Niu ............... H01M 4/8657 429/409 |
| 2008/0305377 A1* | 12/2008 | Shui ............... B22F 9/24 428/397 |
| 2011/0275005 A1* | 11/2011 | Zhu ............... B82Y 30/00 977/773 |
| 2012/0251924 A1 | 10/2012 | Krosnicki et al. |
| 2017/0033369 A1 | 2/2017 | Burton et al. |
| 2017/0244109 A1 | 8/2017 | O'Malley et al. |

FOREIGN PATENT DOCUMENTS

| | | |
|---|---|---|
| KR | 20170107345 A * | 9/2017 |
| KR | 10-2019-0021551 A | 3/2019 |
| WO | WO 2015/092371 A1 | 6/2015 |

OTHER PUBLICATIONS

Machine translation of KR20170107345 of Lee et al (Year: 2017).*
Office Action received in Chinese Patent Application No. 202080051292.5 on Sep. 20, 2023.
International Search Report in PCT/EP2020/065814 issued Aug. 19, 2020.

* cited by examiner

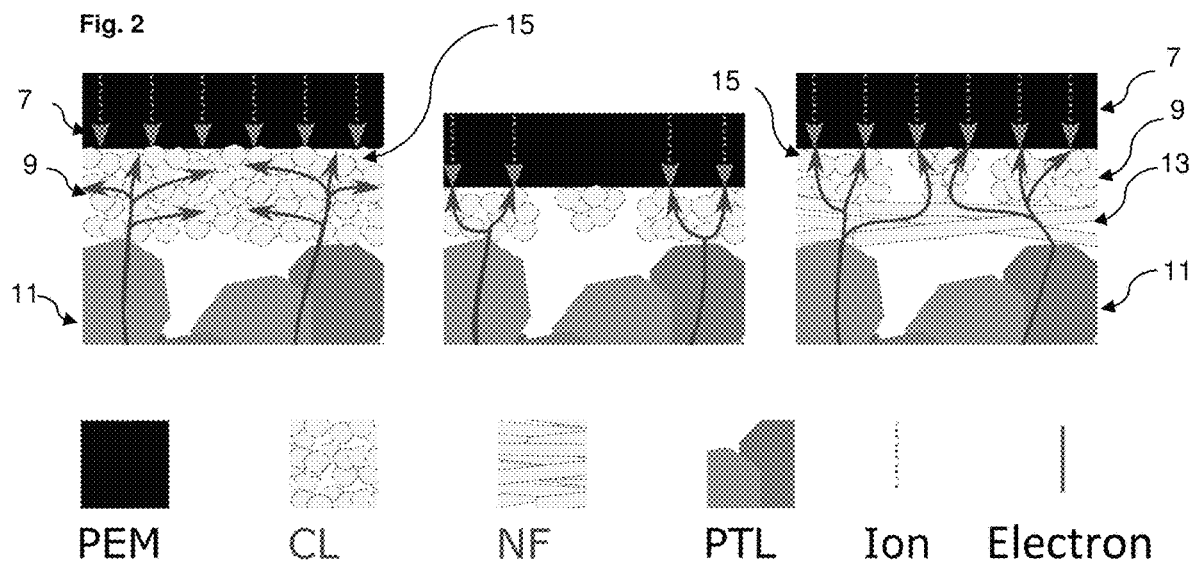
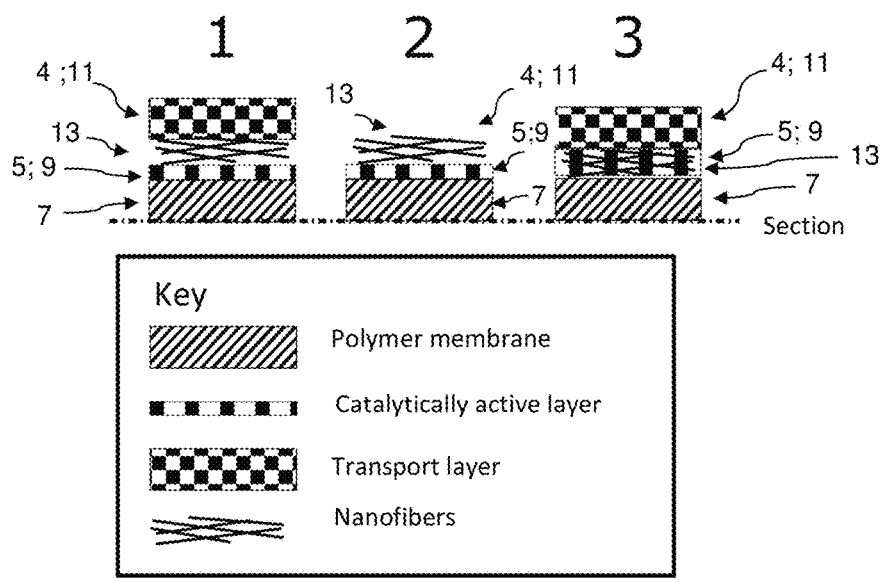

Fig. 4
A
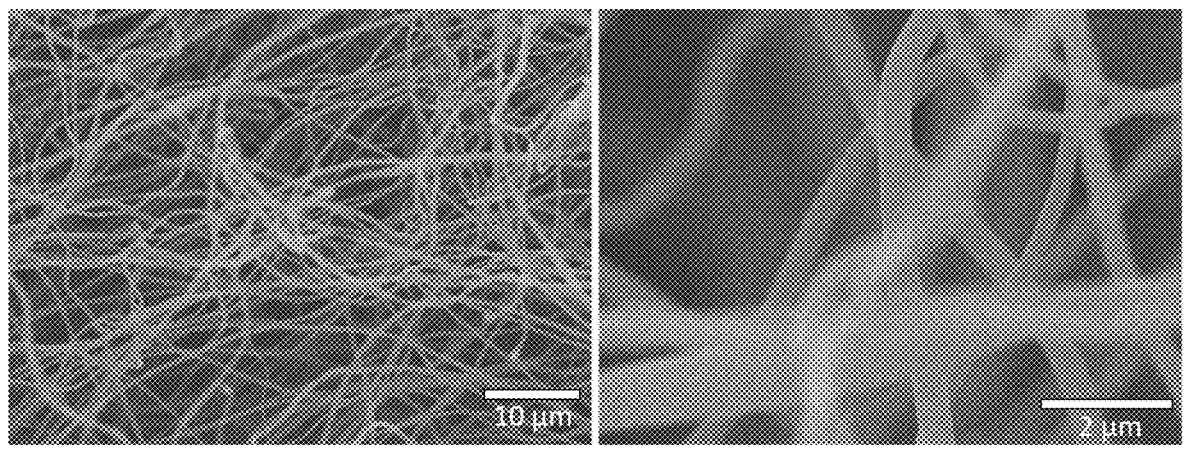
B
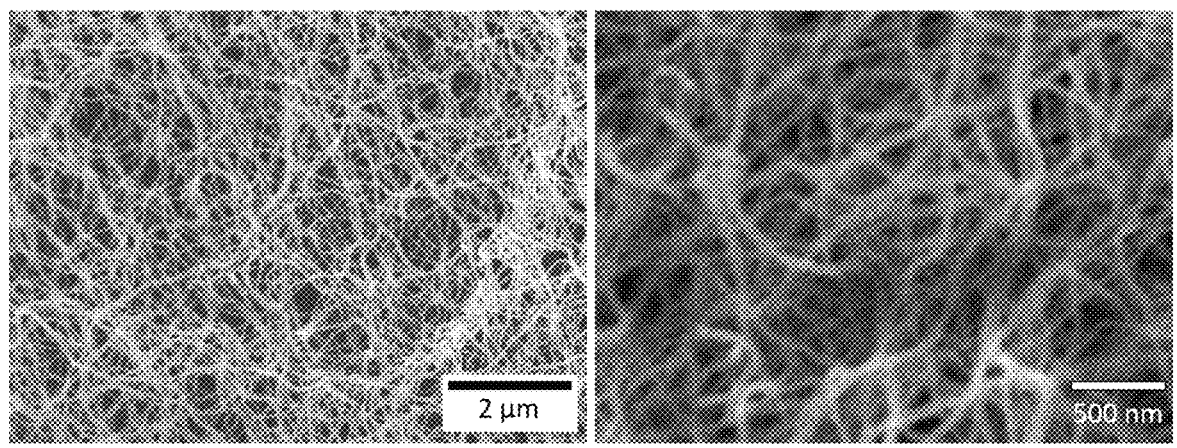

ELECTRICALLY CONDUCTIVE NANOFIBERS FOR POLYMER MEMBRANE-BASED ELECTROLYSIS

The invention preferably relates to an electrolytic cell for generating hydrogen and oxygen, with a layer system comprising at least one pair of catalytically active layers between which a polymer membrane is arranged, the layer system comprising electrically conductive ceramic or metallic nanofibers. In particular, the layer system comprises a pair of catalytically active layers, and transport layers close to the anode and/or cathode, wherein the pair of catalytically active layers comprises catalytically active nanoparticles, and wherein, in order to increase in-plane conductivity or connectivity of the catalytically active nanoparticles, an intermediate layer comprising ceramic or metallic nanofibers is present between one of the catalytically active layers and one of the transport layers, or metallic or ceramic nanofibers are present within one of the catalytically active layers in addition to the catalytically active nanoparticles. The nanofibers here can themselves be catalytically active or catalytically inactive.

BACKGROUND OF THE INVENTION AND PRIOR ART

The invention relates to the field of electrolysis using polymer membranes. In electrolysis, hydrogen and oxygen are produced from water by means of electrical energy. Polymer membrane electrolysis apparatuses are generally composed of a central polymer membrane and, on either side, catalyst layers which act as anode and cathode respectively, transport layers and flow fields. Such apparatuses are also referred to as electrolyzers. The membrane has the function of separating and electrically isolating the gases produced. The chemical reactions take place in the catalyst layers, i.e. the gases are produced there. Water is supplied via the transport layers, gases are also transported away and the catalyst layers are electrically contacted with the flow fields. The transport layers can also be referred to as gas diffusion layers.

In acid electrolysis (FIG. 1 left), protons are migrated through the membrane as charge carriers. The polymer membrane consists of a proton-conducting polymer, e.g. perfluorosulfonic acid (PFSA). Acid electrolysis is also referred to as PEM electrolysis (with a proton exchange membrane or polymer electrolyte membrane PEM). The catalyst layers usually consist of nanoparticles, e.g. $IrO_x$ or $IrRuO_x$ on the anode side and platinum on carbon on the cathode side, each with a proton-conducting polymer (e.g. PFSA) as a binder. The transport layers are usually a titanium nonwoven, titanium sintered metal or titanium stretched lattice (anode side) and a carbon-fiber scrim on the cathode side.

In alkaline electrolysis (FIG. 1 right), hydroxide ions are migrated through the membrane as charge carriers. The polymer membrane consists of an anion-conducting polymer, e.g. hexamethyl-p-terphenyl poly(benzimidazolium) (HMT-PMBI). Alkaline electrolysis with a polymer membrane, is also referred to as anion exchange membrane electrolysis or AEM electrolysis. The catalyst layers are usually composed of nickel alloys on the anode side and platinum on carbon on the cathode side. The transport layers are usually a nickel foam (anode side) and a carbon-fiber scrim (cathode side).

Electrolysis takes place by applying a DC voltage by means of so-called flow fields, which in the simplest case are formed by two end plates. The single cell schematically shown in FIGS. 1 and 2 leads in repeated arrangement to a cell stack, an electrolytic cell stack. Here, the individual electrolytic cells are arranged between bipolar plates that form the flow fields. Typically, the stack is enclosed in two end plates to which a voltage can be applied. The power consumption of the stack increases depending on the number of cells (cell voltage) and the active cell area (cell current).

One challenge in polymer membrane-based electrolysis is the reduction of catalyst loading with a view to commercialization on a larger scale.

The catalyst layers usually consist of nanoparticles, which have an increased activity due to an increase in surface area.

Since catalyst support materials are either not stable or difficult to manufacture and process in a corrosive anode, pure catalyst anodes are very common. Therefore, high catalyst loadings are required to provide a large enough active surface area to achieve high performance. When the loading of catalytically active material is reduced, insufficient electrical contact of the catalyst material contributes significantly to the overvoltage. This is due to poor electron conductivity in the plane of the catalyst layer between the contact points with the porous transport layer (FIG. 2; Polonský, et al. J Appl. Chem. Electrochem 47 (2017) 1137-1146, M. Bernt, et al. J. Electrochem. Soc. 165 (2018) F305-F314.)

It has been shown that a microporous layer (MPL) between catalytic layer (CL) and a transport layer (the porous transport layer (PTL)) can improve in-plane electron conduction and ohmic interface resistance. MPLs fabricated, for example, by vacuum plasma spraying (Lettenmeier, et al. J. Power Sources 311 (2016) 153-158) show performance enhancement but are more expensive.

Alia et al. have proposed the use of iridium-nickel and iridium-cobalt nanofibers to form catalytically active layers and report performance enhancements (Alia, S. M.; Shulda, S.; Ngo, C.; Pylypenko, S.; Pivovar, B. S. Iridium-Based Nanowires as Highly Active, Oxygen Evolution Reaction Electrocatalysts. ACS Catal. 2018, 8, 2111-2120). However, nanofibers have a disadvantage over nanoparticles in that they have a smaller surface area, as nanoparticles can be more finely dispersed and have a higher specific surface area due to their sphere-like shape. Since the catalytic activity is directly dependent on the surface area, the proposed solution has potential for improvement in terms of increasing the catalytic activity.

In the prior art, the use of carbon-based nanofibers is also known.

US 2012/251924 A1 discloses a PEM electrolytic cell having an active layer comprising fullerenes and metals as catalysts. By providing a carbon electronic conductor without fullerenes, the performance is to be improved. Preferably, the carbon electronic conductor is colloidal carbon particles, such as "carbon black". However, in one embodiment, the use of carbon nanofibers is also proposed.

US 2017/244109 A1 describes a catalyst, in particular for oxygen evolution reaction (OER) comprising particles of iridium oxide and a metal oxide, e.g. titanium, tantalum, niobium or manganese oxide. A preferred use relates to fuel cells (PEMFC), which may comprise an electrocatalyst, e.g. of platinum, in addition to the catalyst. In one embodiment, it is proposed that the electrocatalyst may be supported by a carbon nanofiber support.

WO 2015/092371 A1 relates to a catalyst layer comprising a proton-conducting polymer, a platinum-containing electrocatalyst, an OER electrocatalyst and carbonaceous material. The carbonaceous material is preferably conductive and corrosion resistant. In one embodiment, this is present as carbon nanofibers.

US 2006/078784 A1 describes a gas diffusion electrode for electrolytic cells comprising a carrier or transport layer, a cushion or intermediate layer and a catalyst layer. Carbon-based nanofibers can be incorporated into the cushion or intermediate layer. This is intended in particular to compensate for microscopic irregularities of the carrier or transport layer, which comprises, for example, a fabric or paper with carbon fibers.

A disadvantage of the use of carbon-based nanofibers is their low resistance to strong electric fields or high voltages. While, for example, in US 2012/251924 A1 and US 2017/244109 A1 carbon nanofibers are certainly capable of increasing performance in the context of providing fuel cells, their use in electrolytic cells is not advantageous in every case. In acid electrolytic cells in particular, for example, very high voltages occur on the anode side, which lead to destruction of the carbon-based nanofibers.

KR 2019 0021551 relates to an approach for optimizing a gas diffusion electrode or porous transport electrode (PTE) based assembly. KR 2019 0021551 describes a membrane electrode assembly (MEA) with a polymer electrode membrane (PEM) arranged between a pair of catalytically active layers. KR 2019 0021551 proposes to interpose an intermediate layer of nanofibers between the catalytically active layers and the transport layers. The nanofibers are formed from titanium oxide and deposited as a nanofiber mat directly onto microporous gas transport layers by electrospinning. This is followed by thermal treatment (calcination). The aim of applying the nanofibers is to create a homogeneous surface on the microporous gas transport layers by means of a dense nanofiber mat, without holes, in order to optimize catalyst deposition and avoid loss of catalyst material when applied directly to the gas transport layer. The proposed application of nanofibers is specifically limited to improving the surface properties of microporous gas transport layers and is not readily transferable to other layered structures. In particular, thermal treatment (calcination) of the nanofibers on the gas transport layer can only be performed because the microporous gas transport layers are stable to such thermal treatment. In contrast, applying the nanofibers by means of electrospin processes to a catalytically active layer that is already on the polymer membrane and subsequent thermal treatment (calcination) would destroy the polymer membrane.

In light of the state of the art, therefore, there is a need for novel polymer membrane-based electrolytic cells or processes for their production, which allow higher performance at low catalyst loading, are characterized by durability and allow flexible layer structures by means of simple processing.

SUMMARY OF THE INVENTION

One object of the invention was the provision of polymer membrane-based electrolytic cells or methods for their production which eliminate the disadvantages of the prior art. In particular, one task was the provision of polymer membrane-based electrolytic cells which, despite lower catalyst loading, exhibit high performance and are also characterized by high stability, durability and low manufacturing costs due to simple processing.

The object is solved by the independent patent claims. The dependent patent claims represent preferred embodiments.

In one embodiment, the invention relates to an electrolytic cell for the generation of hydrogen and oxygen, a layer system comprising at least one pair of catalytically active layers between which a polymer membrane is arranged, the layer system comprising the following layers a pair of catalytically active layers to form an anode and a cathode, an anode-side transport layer and/or a cathode-side transport layer, wherein an intermediate layer comprising electrically conductive nanofibers is present between one of the catalytically active layers and a transport layer, wherein at least one of the catalytically active layers comprises a mixture of catalytically active nanoparticles and electrically conductive nanofibers and/or wherein one of the transport layers comprises electrically conductive nanofibers.

Particularly preferably, the nanofibers are metallic or ceramic nanofibers, wherein the pair of catalytically active layers comprises catalytically active nanoparticles and the ceramic or metallic nanofibers are incorporated to improve the connectivity of the catalytically active nanoparticles or to increase the in-plane conductivity of the catalytically active layer or the layer composite of catalytically active layer and intermediate layer.

The increase of the in-plane conductivity preferably means an increase of the electrical connectivity of the catalytically active nanoparticles in order to increase the in-plane conductivity within the catalytically active layer or within a layer composite of catalytically active layer and intermediate layer. Furthermore, the nanofibers can reduce the contact resistance between the transport layer and the catalyst layer and further reduce the mass transport resistance by increasing the porosity.

The invention thus preferably relates to an electrolytic cell for the generation of hydrogen and oxygen with a layer system comprising at least one pair of catalytically active layers between which a polymer membrane is arranged, the layer system comprising the following layers a pair of catalytically active layers to form an anode and a cathode an anode-side transport layer and/or a cathode-side transport layer, wherein the pair of catalytic active layers comprises catalytically active nanoparticles, and wherein, to increase in-plane conductivity or improve connectivity of the catalytically active nanoparticles, there is an additional intermediate layer comprising metallic or ceramic nanofibers between one of the catalytically active layers and a transport layer or wherein metallic or ceramic nanofibers are present within one of the catalytically active layers in addition to the catalytically active nanoparticles.

Preferably, the layering system comprises the following layers:

a cathode-side transport layer
a first catalytically active layer to form a cathode
a polymer membrane
a second catalytically active layer to form an anode
an anode-side transport layer, wherein the layers are particularly preferably arranged in the aforementioned order, wherein the first and/or second catalytically active layer comprises catalytically active nanoparticles, an intermediate layer comprising electrically conductive nanofibers is present between one of the catalytically active layers and a transport layer, at least one of the catalytically active layers has a mixture of catalytically active nanoparticles and electrically conductive nanofibers and/or one of the transport layers comprises electrically conductive nanofibers. Preferably, the nanofibers are electrically conductive ceramic or metallic nanofibers, which lead to an increase in in-plane conductivity or an improvement in the electrical connectivity of the catalytically active nanoparticles.

The inventors have recognized that, using electrically conductive nanofibers for the layers of an electrolytic cell, surprisingly high improvement in performance can be achieved, while at the same time keeping catalyst loading low. When using metallic or ceramic nanofibers, a high electrical conductivity with a high durability can advantageously be achieved, even in the presence of strong electric fields.

The advantages of the conductive nanofibers, can preferentially be realized in different configurations:

FIG. 3 shows examples of particularly preferred configurations for forming or replacing layers of a layer system by means of nanofibers. The nanofibers may be catalytically active or catalytically non-active. The following example configurations may be preferred:

Configuration 1 shows a preferred embodiment in which the electrically conductive nanofibers form an intermediate layer between a catalytically active layer and a transport layer.

Preferably, the catalytically active layer is formed by nanoparticles, which are preferably composed of a catalytically active material. Typically, the nanoparticles may exhibit a diameter of 1 nm-1000 nm. Such nanoparticles, for example iridium (IV) oxide particles, are commercially available and can be applied to the polymer membrane by means of roll-to-roll processes using a dispersion, for example by spray coating, slot-die coating, or curtain coating. Due to the provision of an increased surface area, the nanoparticles result in an intrinsically high activity.

According to the invention, it was recognized that surprisingly high improvements in performance can be achieved by combining a catalytically active layer, in particular based on nanoparticles, with electrically conductive nanofibers, preferably metallic or ceramic nanofibers. In this way, the nanofibers cause a significant increase in in-plane conductivity, i.e., a lateral conductivity within the layer. This can ensure excellent conductivity between a transport layer and the catalytically active layer, so that even at low loading there is sufficient electrical contact of the catalyst material and overvoltage is avoided. In this regard, it is possible that the entire (costly) catalytically active material is in the form of nanoparticles. A non-catalytic (lower cost) material may be used for the nanofibers, such that the nanofibers are catalytically inactive but increase the connectivity of the nanoparticles due to their conductivity. Alternatively, it may be equally preferred that some of the catalytically active material is present as nanoparticles and some of the catalytically active material is present as nanofibers. As shown by the experimental data, the use of a structural hybrid of nanoparticles (with high specific surface area) and nanofibers (to ensure in-plane conductivity) leads to surprisingly good results. Moreover, the incorporation of an intermediate layer comprising nanofibers, preferably metallic or ceramic nanofibers, increases the stability of the electrolytic cell, significantly reducing efficiency reductions with increasing product age. A high porosity of the nanofibers further facilitates mass transport and leads to an additional increase in efficiency. The nanofibers can also reduce the contact resistance between the transport layer and the catalyst layer.

Surprisingly, it was found that the described advantages also occur when, instead of an additional intermediate layer, the catalytic layer is formed from a mixture of nanofibers and nanoparticles. That is, in this embodiment, the nanofiber is not applied as a separate layer on top of the catalytically active nanoparticles, but is incorporated directly into the catalytically active layer in addition to the catalytically active nanoparticles.

Advantageously, the above-described advantages in terms of increasing in-plane conductivity and performance (or the possibility of reducing the cost-intensive catalytic material while maintaining the same performance) can be achieved both with an intermediate layer of nanofibers on nanoparticles (configuration 1, FIG. 3) and by additionally introducing nanofibers into a catalytically active layer with the nanoparticles (configuration 3, FIG. 3).

Configuration 3 (FIG. 3) shows a preferred embodiment in which at least one of the catalytically active layers comprises a mixture of catalytically active nanoparticles and nanofibers. In the embodiment, the catalytically active layer is thus characterized by two structural components. Firstly, the layer comprises nanoparticles which are substantially spherical or have a sphericity of more than more than 0.1, preferably more than 0.2, 0.5, 0.7 or more than 0.9. Secondly, the catalytically active layer has nanofibers characterized by a rod shape and high aspect ratios of more than 5, preferably more than 10, more than 100. The combination of nanofibers and nanoparticles causes synergistic effects which the person skilled in the art could not expect.

Thus, the nanoparticles embedded in the nanofibers cause a substantial increase in overall activity, whereby surface enlargement in combination with increased in-plane conductivity exhibits excellent overall activities, even at very low loadings. Thus, good electrical connectivity of the catalytic material can be ensured even at a low loading and with very thin catalytically active layers. As the examples show, a similarly high efficiency can be achieved with a mixed layer of nanofibers and nanoparticles at a total loading of only 0.2 $mg_{Ir}/cm^2$ (milligrams of iridium per square centimeter) as when using six times the loading of 1.2 $mg_{Ir}/cm^2$ in the case of a conventional catalytically active layer consisting exclusively of nanoparticles.

Particularly good results could be achieved with a mixing ratio of nanofibers to nanoparticles from 0.25:1 to 4:1, particularly preferably from 0.5:1 to 2:1. Here, the mixing ratio preferably refers to the proportions by weight of the nanoparticles or nanofibers. Furthermore, a homogeneous static distribution of nanoparticles and nanofibers within the layer is particularly preferred, for which it may be preferred, for example, to mix the nanoparticles and nanofibers before applying them as a catalytically active layer. Alternatively, nanoparticles and nanofibers may be successively applied in an alternating manner on top of each other to form a catalytically active layer.

In both configurations or embodiments, the nanoparticles preferably consist of a catalytically active material. The nanofibers may also consist of a catalytically active material or be coated with such material. However, an improvement in performance can in particular also be recorded with nanofibers which have been formed from a non-catalytically active material. In particular, their contribution to increasing the in-plane conductivity within the catalytically active layer contributes to this.

Thus, both configurations have in common that the incorporation of the nanofibers increases the crosslinking or electrical connectivity of the catalytically active nanoparticles.

As will be explained in detail below, the nanofibers can advantageously be processed as a dispersion, such that various coating processes can be used which are based on the application of a liquid dispersion (or ink). Dispersion preferably means a heterogeneous mixture of the (preferably comminuted) nanofibers as disperse phase and a liquid dispersion medium. Due to the possibility of processing as a dispersion or ink, a series of coating processes can be used, including in particular roll-to-roll processes, such as spray coating, slot-die coating or curtain coating. In particular, the latter are industrial processes suitable for mass production, so that the incorporation of the nanofibers according to the invention can be easily implemented in existing industrial processes for the provision of electrolytic cells.

In addition, there is a high degree of flexibility with respect to the insertion of the nanofibers into the layer system to improve the connectivity of the nanoparticles.

Advantageously, the nanofibers can be applied in particular both together with the nanoparticles as a mixture and separately therefrom as an additional intermediate layer.

Configuration 2 in FIG. 1 illustrates another embodiment in which one of the transport layers comprises electrically conductive nanofibers. Preferably, these are ceramic or metallic nanofibers. The transport layers serve to supply water and to remove the resulting gases (oxygen and hydrogen), as well as to electrically connect the catalyst layers. As a rule, anode-side transport layers comprise, for example, titanium compounds, while cathode-side transport compounds are based on carbon compounds.

The use of electrically conductive nanofibers for a transport layer advantageously also leads to increased in-plane conductivity, resulting in an increase in efficiency. The term in-plane conductivity preferably refers in particular to whether (and if so, how well) the catalyst material is connected to a current side. An increase in the in-plane conductivity can therefore also be understood as an increase in the connectivity of the catalytically active material, in particular of nanoparticles, to a current side (on the anode or cathode side).

In preferred embodiments, the transport layer may be formed exclusively from nanofibers. For this purpose, it may be preferred to use nanofibers made of titanium compounds for anode-side transport layers, while carbon-based nanofibers may preferably be used for cathode-side transport layers. Advantageously, with such transport layers, both a more efficient supply of water and removal of the gases produced (oxygen and hydrogen) can be achieved, and a particularly efficient electrical connectivity of catalyst layers (for example comprising nanoparticles) can be ensured.

For the purposes of the invention, the term "nano" preferably refers to structures with characteristic dimensions in the nanometer range.

"Nanofibers" are generally understood to be fibers exhibiting a fiber diameter in the nanometer range, preferably exhibiting a diameter from about 10 to about 1000 nm, preferably greater than 10 nm and less than 1000 nm.

Terms such as substantially, approximately, about, etc. preferably describe a tolerance range of less than ±20%, preferably less than ±10%, even more preferably less than ±5% and particularly less than ±1%. Indications of substantially, approximately, about etc. always also disclose and comprise the exact value mentioned.

In preferred embodiments, the nanofibers exhibit a diameter of 10 nm-1000 nm, preferably 50 nm-400 nmm. Intermediate ranges from the aforementioned ranges may also be preferred such as 10 to 20 nm, 20 to 50 nm, 50 nm to 100 nm, 100 nm to 200 nm, 200 nm to 300 nm, 300 nm to 400 nm, 400 nm to 500 nm, 600 nm to 700 nm, 700 nm to 800 nm, 800 nm to 900 nm, 900 nm to 1000 nm. A person skilled in the art will recognize that the aforementioned range limits may also be combined to obtain other preferred ranges, such as 50 nm to 300 nm, 200 nm to 800 µm, or 100 nm to 400 nm.

Fiber preferably means a linear thin structure whose cross-sectional dimension is small compared to its length. The ratio of cross-sectional dimension to length is preferably referred to as aspect ratio. In the case of a nanofiber, the aspect ratio preferably corresponds to the ratio of diameter to length.

In a preferred embodiment of the invention, the nanofibers have an aspect ratio of 5-1000, preferably 10-100. Intermediate ranges from the foregoing ranges may also be preferred such as, for example, 5 to 10, 10 to 20, 20 to 30, 30 to 40, 40 to 50, 50 to 80, 80 to 100, 100 to 200, 200 to 300, 300 to 400, 400 to 500, 600 to 700, 700 to 800, 800 to 900, 900 to 1000. A person skilled in the art will recognize that the foregoing range limits may also be combined to provide other preferred ranges such as, for example, 10 to 40, 30 to 80, or 200 to 700.

The aforementioned preferred dimensions for the nanofibers lead to a particularly pronounced increase in the efficiency and stability of an applied layer.

Particularly preferably, the nanofibers have a length of less than 20 µm, preferably less than 10 µm. For example, lengths in the range of 2 µm to 10 µm may be preferred. For this purpose, the nanofibers can be reduced into shorter pieces by a suitable process such as, for example, treatment with ultrasound or mechanical shearing in a ball mill. The shorter pieces with a length of less than 20 µm, preferably less than 10 µm may also preferably be referred to as "nanorods".

Compared to longer nanofibers, which are available as fabric, for example, the shorter pieces (nanorods) can be processed much more easily. For example, the nanorods can be provided as a powder, which can be applied as a dispersion (or as an ink) simply and cheaply by means of common coating processes.

The nanofibers are electrically conductive. The electrical conductivity preferably refers to the ability of a material to conduct electric current. Typically, electrical conductivity is abbreviated by σ and has the unit (Siemens per meter). Particularly preferably, the ceramic or metallic nanofibers are composed of a material having a conductivity greater than 10 S/m, preferably greater than $10^2$, $10^3$, $10^4$, $10^5$ or greater than $10^6$ S/m. Preferably, the nanofibers are made of electrically conductive ceramic or a metal. Ceramic materials are inorganic, non-metallic and polycrystalline. In particular, the term ceramic also includes engineering ceramics, oxide ceramics, for example metal oxides, and non-oxide ceramics, for example carbides, nitrides, borides or silicides.

For the purposes of the invention, ceramic or metallic nanofibers preferably refer to nanofibers comprising compounds having a predominant amount of metals. For example, compounds having a metal content greater than 50 percent by weight (wt %), greater than 60 wt %, 70 wt %, 80 wt %, or even greater than 90 wt % are preferred.

While metallic nanofibers are preferably pure metal compounds or alloys, ceramic nanofibers are preferably characterized as metal compounds which, in addition to the metallic portion, have light compounds such as oxygen, carbon or nitrogen.

In both cases, the metallic content in the nanofibers advantageously causes both electrical conductivity and increased resistance to strong electric fields. The metallic or ceramic nanofibers thus allow improved longevity of the electrolytic cells in contrast to the carbon nanofibers described in the prior art.

For the purposes of the invention, "nanoparticle" preferably means a particle in the nanometer range, preferably the largest dimension of the nanoparticle being in a range from about 1 nm to about 1000 nm, preferably from 1 nm to 1000 nm, preferably from 1 nm or more to less than 1000 nm, more preferably from about 1 to 300 nm.

In a preferred embodiment of the invention, the nanoparticles exhibit a maximum dimension of 10 nm-1000 nm, preferably from 20 nm to 500 nm. Intermediate ranges from the aforementioned ranges may also be preferred such as 10 to 20 nm, 20 to 50 nm, 50 nm to 100 nm, 100 nm to 200 nm, 200 nm to 300 nm, 300 nm to 400 nm, 400 nm to 500 nm, 600 nm to 700 nm, 700 nm to 800 nm, 800 nm to 900 nm, 900 nm to 1000 nm. A person skilled in the art will recognize that the aforementioned range limits may also be combined to obtain other preferred ranges, such as 10 nm to 100 nm, 50 nm to 400 nm, or 200 nm to 500 nm.

In a preferred embodiment, the nanoparticles have a sphericity of more than 0.1, preferably more than 0.2, 0.5, 0.7 or more than 0.9. The sphericity of an object preferably corresponds to the ratio of the surface area of a sphere of the same volume to the surface area of the object. Thus, a sphere has a sphericity of 1, while a cube, for example, has a sphericity of about 0.8. For the aforementioned preferred sphericity, the nanoparticles have an increased surface area in relation to their volumes, which has a positive effect on their catalytic activity.

The combination of nanoparticles with nanofibers (both as an intermediate layer and embedded in the catalytic layer) allows a particular improvement in performance. The surface enlargement (due to the spherical nanoparticles) together with an increased in-plane conductivity (due to the elongated nanofibers) leads to an excellent overall activity, even at very low loadings. Thus, a good electrical connectivity of the catalytic material can be ensured even for low loaded and very thin catalytically active layers.

In a preferred embodiment, loading of the catalytically active layer with catalytically active material was selected in a region which, when the metallic or ceramic nanofibers are provided, ensures sufficient in-plane conductivity to operate the electrolytic cell and, without provision of the metallic or ceramic nanofibers, does not provide sufficient in-plane conductivity to operate the electrolytic cell.

Advantageously, by increasing the in-plane conductivity or improving the connectivity between the catalytically active nanoparticles by means of the nanofibers, the loading with catalytic material can be reduced. Typically, the catalytically active material, is high cost material, for example a precious metal, particularly preferred precious metals are platinum metals, which include ruthenium (Ru), rhodium (Rh), palladium (Pd), osmium (Os), iridium (Ir) and platinum (Pt). To enable economically efficient use of the electrolytic cells, the proportion of the catalytically active material should be reduced as far as possible. A lower limit is given by the performance which ensures reasonable operation. In particular, too low a loading of catalytically active material leads to reduced in-plane conductivity or connectivity and thus to a drop in performance, so that useful operation of the electrolytic cell is not possible.

The inventors have recognized that by incorporating the metallic or ceramic nanofibers, the required minimum amount of catalytic material can be drastically reduced by a factor of more than 2, preferably more than 5. With undiminished performance, the cost saving achieved can thus provide a particularly economical solution.

In a preferred embodiment, the electrolytic cell is characterized by a total loading of catalytically active material of 0.5 mg/cm$^2$ (milligrams of catalytically active material per square centimeter) or less, preferably 0.4 mg/cm$^2$, 0.3 mg/cm$^2$, or 0.2 mg/cm$^2$ or less. The total loading preferably refers to a cathode side or anode side loading of catalytically active material. Here, the catalytic material is considered for both the catalytically active nanoparticles and the nanofibers, provided that the nanofibers comprise catalytically active material. Particularly preferably and advantageously, such a low total loading of catalyst material is possible on the anode side for an acidic PEM electrolytic cell.

Precious metals, such as the platinum metals iridium, ruthenium or platinum, are particularly preferred as the catalytically active material on the anode side for an acidic PEM electrolytic cell. Such low loadings of precious metals are not possible with prior art processes without using the nanofibers according to the invention, without severe performance losses being recorded, which prevent a useful operation of the electrolytic cells.

The production of the nanofibers and the incorporation of the nanofibers can be achieved by different methods.

The nanofibers can be produced, for example, by means of spinning processes and thermal post-treatment. Suitable processes for the production of nanofibers are, for example, electrochemical deposition processes such as template assisted electrodeposition, or spinning processes such as electrospinning, centrifugal spinning and solution-blow spinning.

In the first step, a solution consisting of a carrier polymer and one or more metal precursor compounds of a desired ceramic is prepared. The metal precursor compound is usually a salt or a coordination compound, but nanoparticles of the desired ceramic or ceramic precursors are also possible. For doped ceramics or mixed ceramics, multiple metal (precursor) compounds are placed in solution. For the production of metallic nanofibers, a solution with metals is preferably also provided, for example, in the form of nanoparticles with a carrier polymer.

Carrier polymer preferably means a "polymer", whereby the addition of "carrier" indicates that in the manufacturing process the polymer is preferably removed from the nanofibers after successful fabrication of the nanofiber structure. Polymer preferably includes, and is not limited to, homopolymers, such as copolymers, such as block, graft, random and alternating copolymers, terpolymers, etc., and mixtures and modifications thereof. Polymers for a carrier polymer may include, but are not limited to, polylactides, polylactic acid, polyolefins, polyacrylonitrile, polyurethane, polycarbonate, polycaprolactone, polyvinyl alcohol (PVA), cellulose, chitosan nylon (e.g., nylon 6, nylon 406, nylon 6-6, etc.), polystyrene, proteins, and the like, or combinations thereof. Unless specifically stated otherwise, the term includes all possible geometric configurations of the material. These configurations include, but are not limited to, isotactic, syndiotactic, and random symmetries. Suitable solvents for each carrier polymer may be selected from solvents known to those skilled in the art, including, but not limited to, sulfuric acid, chloroform, tetrahydrofuran, dimethylformamide, water, acetone, and combinations thereof. As used herein, polymeric compound or polymer blend refers to combinations of different types and amounts of polymers, as well as combinations (blends) of polymers with other materials. Particularly preferred carrier polymers include polyvinylpyrrolidone (PVP), polyvinyl alcohol (PVA), or cellulose.

In the subsequent electrospinning process, nanofibers (usually a nanofiber fabric) are produced from the dissolved material by placing the solution in an electric field. This is usually done by injecting the solution into the electric field with a syringe. The field strength is usually 10-30 kV. The nanofibers exhibit an average nanofiber diameter of 150 nm-1500 nm, depending on the processing (solvent, concentration of the solution, applied voltage, flow rate, etc.) and material composition.

Electrospinning preferably refers to a technology that produces nanometer-sized fibers from a solution that utilizes interactions between fluid dynamics and charged surfaces. Generally, forming electrospun fibers involves providing a solution to an opening in an object electrically connected to a voltage source, wherein electrical forces help form fine fibers that are deposited on a surface that can be grounded or otherwise at a lower voltage than the body. In electrospinning, a carrier polymer solution together with one or more metal precursor compounds of the desired ceramic provided by one or more needles, slots or other apertures is charged to a high voltage relative to a collection grid. Electrical forces overcome the surface tension and cause a fine stream of the solution to move toward the grounded or oppositely charged collection grid.

The beam can propagate into even finer fiber streams before reaching the target and is collected as a coherent network of small fibers. The dried or consolidated fibers can exhibit diameters ranging from about 10 nm to 1000 nm. Various forms of electrospun nanofibers include branched nanofibers, tubes, ribbons and split nanofibers, nanofiber yarns, surface coated nanofibers (e.g., with carbon, metals, etc.), vacuum fabricated nanofibers, etc. The fabrication of nanofibers is addressed in various publications, for example, also P. W. Gibson et al, "Electrospun Fiber Mats: Transport Properties," AIChE Journal, 45(1): 190-195 (January 1999), which is incorporated herein by reference.

In the third step, the nanofiber material is thermally and/or chemically posttreated. In this step, the carrier polymer is completely removed, for example by elevated temperature and complete oxidation of the carrier polymer to carbon dioxide and water and optionally nitrogen oxides and sulfur oxides. In the same step, the metal salt is oxidized to the metal oxide. This metal oxide can already represent the desired ceramic. Preferred metals are all transition metals (Sc, Ti, V, Cr, Mn, Fe, Co, Ni, Cu, Zn, Zr, Nb, Mo, Ru, Rh, Hf, W, Re, Os, Ir) and lanthanides. Chemical post-treatment allows the modification of ceramics to nitrides, carbides, silicates, borates, etc.

The ceramic nanofibers can subsequently be comminuted into shorter pieces, referred to as nanorods, by a suitable process such as treatment with ultrasound or mechanical shearing in the ball mill. Preferred aspect ratios of the nanorods of 5-1000, preferably 5-250 or 10-100 can be configured by this. Particularly preferably, nanofibers having a length of less than 20 µm, preferably less than 10 µm can be obtained thereby. This leads to a simplified processing from dispersion, for example by means of spray coating, and a homogeneous distribution of the nanorods on the coated surface.

The nanorods can then be coated onto a suitable substrate using a binder polymer in a coating process. Suitable coating processes include, for example, spray-on, thermal spray, preferably a plasma spray or vacuum plasma spray, spray coating, slot die, roll-to-roll equipment, doctoring, and/or drop casting. The binder polymer comprises an ionically conductive, electrically conductive or inert polymer, or a blend thereof, which serves to mechanically stabilize the layer. Preferred binder polymers are PFSA and PTFE.

In a preferred embodiment, the metallic or ceramic nanofibers are thus produced as a coherent network of nanofibers by means of a spinning process, thermally posttreated (calcinated), comminuted as a dispersion for further processing and subsequently incorporated into the layer system by means of a coating process. The processing of the comminuted nanofibers, or nanorods, in a coating process as a dispersion allows a particularly flexible application for different layer structures or manufacturing scenarios. For example, the nanorods can be provided as a powder and incorporated later in a manufacturing process. In particular, this allows the nanofibers to be incorporated by means of coating processes that are used on an industrial scale, including in particular roll-to-roll processes such as slot-die coating or curtain coating.

Moreover, direct application on a polymer membrane is possible through the coating process. Such possible applications are not provided by the approach described in KR 2019 0021551, which provides for direct electrospinning of a nanofiber fabric on a microporous gas transport layer.

Preferably, different materials can be used for the production of the nanofibers. Preferred materials are, for example, metal oxides or metal nitrides.

The nanofibers may additionally promote a chemical reaction and thus be catalytically active. The ceramic nanofibers may be coated with catalytically active nanoparticles or a thin layer consisting of catalytically active material.

A catalytically active layer preferably means a layer comprising a catalytically active material which has electrocatalytic properties with respect to the release of oxygen for the anode side or hydrogen for the cathode side. To form catalytically active layers, the polymer membrane can be directly coated with precious metal electrodes and their oxides as electrocatalysts (e.g. platinum, iridium, iridium dioxide ($IrO_2$), rhodium, rhodium oxide ($RhO_2$). Alternatively, the electrocatalysts may be coated on the transport layers.

As pure layers of catalytically active material, the catalytically active layers may form the anodes or cathodes. It may also be preferred that the catalytically active material is applied to carrier materials, for example carbon or precious metal electrodes.

For acidic PEM water electrolysis, for example, iridium is known for its distinct electrocatalytic properties related to oxygen release processes. Therefore, as a catalytically active material, iridium may be a preferred material for the oxygen evolution reaction (OER) at the anode side. Here, it may be preferred that iridium is present in the form of the pure metal or also as an oxide ($IrO_2$), possibly mixed with other oxides or other metals.

In addition, ruthenium (Ru), palladium (Pd), rhodium (Rh), platinum (Pt), gold (Au) and niobium (Nb) or their oxides in particular have been found to have electrically catalytic properties for an OER. Of the aforementioned metals, ruthenium oxides stand out along with iridium oxides, so $IrO_2$ or $RuO_2$ as well as composite compounds thereof are preferred as materials for an anode-side catalytically active layer.

In a preferred embodiment, an (anode-side) catalytically active layer comprises a catalytically active material which comprises a platinum metal-containing, preferably an iridium-containing or ruthenium-containing compound, the compound preferably containing iridium oxides and/or ruthenium oxides, and it also being possible for further elements such as, for example, tin, antimony, vanadium, nickel, cobalt to be added to the compound in addition to iridium or ruthenium. In particularly preferred embodiments, a (anode-side) catalytically active layer comprises $IrO_2$, $RuO_2$, $IrRuO_x$, $IrCoO_x$, $IrNiO_x$ and/or $IrSnSbVO_x$.

The aforementioned materials are particularly suitable for an anode-side catalytically active layer in the case of an acidic PEM electrolytic cell.

On the cathode side, for acid PEM water electrolysis, for example, platinum (Pt) is a particularly active electrocatalyst for the reaction to release hydrogen (hydrogen evolution reaction HER). Preferably, for example, platinum on carbon is used for the cathode. In addition, palladium (Pd), rhodium (Rh), iridium (Ir), rhenium (Re), osmium (Os), ruthenium (Ru) or nickel (Ni) or their oxides in particular also exhibit electrocatalytic activity for generating hydrogen, such that these compounds are suitable for a cathode-side catalytically active layer.

In a preferred embodiment, a (cathode side) catalytically active layer comprises a catalytically active material comprising a compound containing platinum (Pt), palladium (Pd), rhodium (Rh), iridium (Ir), rhenium (Re), osmium (Os), ruthenium (Ru) or nickel (Ni), the compound preferably containing oxides thereof. The catalytically active materials may be present, for example, coated on carbon and bonded to the polymer membrane.

The aforementioned materials are particularly suitable for a cathode-side catalytically active layer in the case of an acidic PEM electrolytic cell.

For an alkaline electrolytic cell, nickel alloys, for example NiFe, Ni, Raney-Ni, Ni-Aluminium alloys, NiMn alloys or Raney-Nickel-Aluminium are particularly suitable for the generation of oxygen (OER) on the anode side. However, other compounds such as $Cu_xCo_xO_x$ or $IrO_x$ can also be used.

In a preferred embodiment, a (anode side) catalytically active layer comprises a catalytically active material comprising a nickel alloy, preferably NiFe, Ni, Raney-Ni, Ni-aluminum alloys and/or NiMn alloys.

The aforementioned materials are particularly suitable for an anode-side catalytically active layer in the case of an alkaline electrolytic cell.

For an alkaline electrolytic cell, compounds containing platinum are particularly suitable on the cathode side for the generation of hydrogen (HER), but other compounds, particularly those based on transition metals, may also be preferred. Non-precious metal-containing or semi-precious metal-containing compounds such as, for example, copper-cobalt compounds (CuCoOx) or nickel compounds (e.g. Ni, Raney-Ni, Ni compounds, Ni—Mo) may also be preferred.

In a preferred embodiment, a (cathode side) catalytically active layer comprises a catalytically active material comprising a platinum-containing compound, particularly preferably the cathode is formed by platinum on carbon.

The aforementioned materials are particularly suitable for a cathode-side catalytically active layer in the case of an alkaline electrolytic cell.

In preferred embodiments of the invention, the catalytically active material of the catalytically active layers is in the form of nanoparticles. Preferably, the catalytically active layers comprise nanoparticles consisting of the aforementioned catalytically active materials. Nanoparticles consisting of catalytically active materials are also referred to as catalytically active nanoparticles.

By applying an additional intermediate layer of nanofibers, by mixing catalytically active nanoparticles with nanofibers or by incorporating nanofibers into the adjacent transport layers, significant increases in efficiency and stability can be achieved.

The transport layers preferably designate the layers of the electrolytic cell through which water is supplied and gases (oxygen or hydrogen) are removed. Furthermore, the transport layer also serves to electrically connect the catalytically active layers with the flow fields, for example bipolar plates in the case of a stack.

In the literature, the transport layers (porous transport layers PTL) are also referred to as gas diffusion layers GDL or liquid gas diffusion layers LGDL or current distributors or current collectors. In preferred embodiments, the transport layers are porous, i.e. permeable, such that liquids (water) or gases (hydrogen or oxygen) can move through them via pores or other passages. In the literature, the transport layers are therefore also referred to as porous transport layers (PTL).

In a preferred embodiment, the cathode-side transport layers comprise carbon-based materials such as graphitized or carbonized carbon fiber paper, carbon fiber scrim, carbon fiber nonwoven fabric, carbon fiber cloth, and/or the like.

The aforementioned materials are preferably suitable for cathode-side transport layers for both an acid electrolytic cell (PEM) and an alkaline electrolytic cell. For the alkaline electrolytic cell it may also be preferred to use nickel.

In a preferred embodiment, the anode-side transport layers comprise non-carbon-based materials such as metal mesh, metal nonwovens, nets, metal staple fibers, metal multifilaments, metal foam, and/or other porous metallic structures For alkaline electrolytic cells, the transport layers are preferably based on nickel as a metal, for example a nickel foam or other porous nickel structure may be preferred as a transport layer.

For acid electrolytic cells, the anode-side transport layers are preferably based on titanium as the metal, for example, a titanium nonwoven, a titanium sintered metal, a titanium stretching grid or other porous titanium structures may be preferred as the transport layer.

Such transport layers are particularly preferred for embodiments in which an intermediate layer comprising electrically conductive nanofibers is present between one of the catalytically active layers and a transport layer, or wherein at least one of the catalytically active layers comprises a mixture of catalytically active nanoparticles and electrically conductive nanofibers. Due to an increase in in-plane conductivity, the nanofibers cause significantly improved electrical contact between the catalytically active layer and the transport layers and thus an increase in efficiency.

In further preferred embodiments, the anode-side and/or cathode-side transport layer comprises electrically conductive nanofibers. In principle, the transport layers can be constructed as explained above. That is, carbon-based, preferably porous materials can be used, for example, for cathode-side transport layers, while metallic, preferably porous materials are used, for example, for anode-side transport layers. In this case, the nanofibers can additionally be inserted into the transport layer in order to obtain the described advantages, in particular with respect to an increase in the in-plane conductivity.

However, it is particularly preferred that the anode-side and/or cathode-side transport layers consist substantially of nanofibers, and that the transport layers are thus formed from nanofibers. For example, anode-side nanofibers based on titanium may be preferred, while cathode-side transport layers are formed by carbon-based nanofibers.

In a preferred embodiment of the invention, electrically conductive nanofibers are formed from a non-catalytically active material. Preferably, the electrically conductive nanofibers thus consist essentially of a non-catalytically active material and therefore have no or a negligible amount of catalytically active material.

Nanofibers of this embodiment are preferably referred to as non-catalytic nanofibers. The non-catalytic nanofibers are characterized in particular by an increase in in-plane conductivity, such that the catalytically active material, for example in the form of catalytically active nanoparticles, contacts optimally and consequently exhibits high efficiency even at low loadings.

The non-catalytically active nanofibers can be used both as an intermediate layer between an electrically active layer and a transport layer, in mixed form with catalytically active nanoparticles or for a transport layer. Particularly preferred is the use of non-catalytically active nanofibers for the transport layer. For use as a transport layer, the nanofibers should thus be electrically conductive, but not necessarily catalytically active. Examples of suitable materials include TiN (titanium nitride), WC (tungsten carbide) or NbO (niobium oxide).

However, it may also be preferred that the nanofibers exhibit catalytic activity. If the nanofibers contain a proportion of catalytically active precious metal, this is taken into account when determining the (precious-metal) loading. The indication of the loading thus always refers to the total amount of the catalytically active material, preferably a precious metal.

In a preferred embodiment, the electrically conductive nanofibers are formed from a catalytically active material or formed from a non-catalytically active material and coated with a catalytically active material. The embodiment of the nanofibers is also referred to as catalytically active nanofibers. In the preferred embodiment, the nanofibers thus preferably consist of a catalytically active material or are present coated together with such a material.

In the embodiment, the nanofibers themselves contribute to the anode-side and/or cathode-side catalytic activity. In this case, the performance enhancement of the electrolytic cell is based on the combination of the nanofibers, which are electrically very conductive and stable, with the nanoparticles, which are very active due to their high surface area. In addition, the nanofiber layer offers efficiency advantages in terms of gas transport in the catalyst layer due to its high porosity.

Preferably, catalytically active nanofibers are used, for example, for an intermediate layer between the transport layer and the catalytically active layer (for example, based on catalytically active nanoparticles). The use of catalytically active nanofibers is also particularly preferred for providing a mixed catalytically active layer of nanoparticles and nanofibers.

The selection of suitable catalytically active materials may depend on whether the nanofibers are used on the anode or cathode side, and whether the electrolytic cell is preferably alkaline (AEM electrolytic cell) or acidic (PEM electrolytic cell).

Suitable catalytically active nanofibers for acid PEM electrolysis (with a proton exchange membrane or polymer electrolyte membrane PEM) include $IrO_2$ and iridium-containing compounds with ruthenium, tin, antimony, vanadium, nickel, cobalt, in particular $IrRuO_x$ (iridium-ruthenium oxide), $IrCoO_x$ (iridium-cobalt oxide), $IrNiO_x$ (iridium-nickel oxide) or $IrSnSbVO_x$ (iridium-tin-antimony-vanadium oxide).

Suitable catalytically non-active (or slightly active) nanofibers for acid PEM electrolysis are, for example, Ti (titanium), $TiO_x$ (titanium oxide) and doped $NbTiO_x$ (niobium titanium oxide), ATO (antimony tin oxide), ITO (indium tin oxide), TiN (titanium nitride), $NbO_x$ (niobium oxide), TaC (tantalum carbide), HfC (hafnium carbide) and/or WC (tungsten carbide).

Preferably, Ir (iridium), $IrO_x$ (iridium oxide), NiFeOx (nickel-iron oxide), $Cu_xCo_xO_x$ (copper-cobalt oxide), Ni (nickel), Ni-aluminum alloys, NiMn (nickel-manganese) alloys, Pt (platinum compounds) or CeLaNi (cerium-lanthanum-nickel) are suitable as catalytically active nanofibers for alkaline AEM electrolysis.

Suitable catalytically non-active (or slightly active) nanofibers for alkaline AEM electrolysis are, for example, Ti (titanium), $TiO_x$ (titanium oxide) and $NiO_x$ (nickel oxide), but also ATO (antimony tin oxide), ITO (indium tin oxide), TiN (titanium nitride), $NbO_x$ (niobium oxide), TaC (tantalum carbide) or HfC (hafnium carbide).

In a preferred embodiment of the invention, the electrolytic cell is characterized in that the electrolytic cell is an acidic electrolytic cell with a proton-conducting polymer membrane and the nanofibers consist of a catalytically active material and/or are coated with a catalytically active material, preferably iridium (Ir) or iridium oxide ($IrO_2$) compounds, particularly preferably of iridium (Ir) or iridium oxide ($IrO_2$) compounds together with ruthenium, tin, antimony, vanadium, nickel, cobalt, most preferably compounds selected from the group consisting of $IrRuO_x$ (iridium-ruthenium oxide), $IrCoO_x$ (iridium-cobalt oxide), $IrNiO_x$ (iridium-nickel oxide) or $IrSnSbVO_x$ (iridium-tin-antimony-vanadium oxide).

In a preferred embodiment of the invention, the electrolytic cell is characterized in that the electrolytic cell is an acidic electrolytic cell having a proton-conducting polymer membrane and the nanofibers are made of a catalytically non-active material, preferably of titanium (Ti), titanium oxide ($TiO_x$) or niobium (Nb) containing compound, particularly preferably selected from the group consisting of $TiO_x$ (titanium oxide, ATO (antimony tin oxide), ITO (indium tin oxide), $NbO_x$ (niobium oxide) or of TaC (tantalum carbide), HfC (hafnium carbide) and/or WC (tungsten carbide).

In a preferred embodiment of the invention, the electrolytic cell is characterized in that it is an alkaline electrolytic cell with a polymer membrane permeable to hydroxide ions ($OH^-$) and the nanofibers consist of a catalytically active material, preferably selected from the group consisting of preferably $IrO_x$ (iridium oxide), NiFeOx (nickel iron oxide), $Cu_xCo_xO_x$ (copper cobalt oxide), Ni (nickel), Ni-aluminium alloys, NiMn (nickel manganese) alloys, Pt (platinum compounds) or CeLaNi (cerium lanthanum nickel).

In a preferred embodiment of the invention, the electrolytic cell is characterized in that it is an alkaline electrolytic cell with a polymer membrane permeable to hydroxide ions ($OH^-$) and the nanofibers consist of a catalytically non-active material, preferably of compounds containing titanium oxide or nickel oxide, particularly preferably of $TiO_x$ (titanium oxide) and/or $NiO_x$ (nickel oxide) but also ATO (antimony tin oxide), ITO (indium tin oxide), TiN (titanium nitride), $NbO_x$ (niobium oxide), TaC (tantalum carbide) or also HfC (hafnium carbide).

Electrolytic cells which are suitable for alkaline electrolysis or acid electrolysis differ in particular with regard to the selection of polymer membrane.

Polymer membrane, for the purposes of the invention, preferably refers to a membrane made of polymeric materials, wherein the membrane is preferably ionically conductive.

For alkaline electrolysis, the polymer membrane is preferably anion-conducting, while for acid electrolysis, the polymer membrane is preferentially proton-conducting. However, the polymer membranes are impermeable to oxygen and hydrogen, respectively, so that the reaction spaces are effectively separated.

The terms anion-conducting, anion-conductive or anion-permeable are preferably used synonymously. Likewise, the terms proton-conducting, proton-conductive or proton-permeable denote the same property of the membrane, namely its ability to specifically conduct protons or to allow them to pass.

Typical membrane thicknesses vary from about 50 µm to 500 µm, preferably about 100 µm to 200 µm, resulting in low ohmic drop, high mechanical stability and gas impermeability.

In a preferred embodiment of the invention, the electrolytic cell is characterized in that the polymer membrane consists of a proton-conductive polymer, for example a perfluorosulfonic acid (PFSA) polymer, and the electrolytic cell is configured for acid electrolysis.

For proton-conducting polymer membranes, polymers with multiple covalently bonded negatively charged groups can generally be used, while anion-conducting membranes generally include polymers with multiple covalently bonded positively charged groups.

Preferred perfluorosulphatic acid (PFSA) polymers can be used as proton-conducting polymer materials, for example, a tetrafluoroethylene-fluorovinyl ether copolymer with sulphonic acid groups can be used for a proton-conducting PFSA membrane. This material is sold by DuPont under the trade name Nafion®. Other suppliers also offer PFSA membranes, e.g. 3M under the product name '3M', AsahiGlass-Cooperation AGC under 'Flemion'®, AsahiKasai under 'Aciplex'® or Solvay under Aquivion®.

However, other ionomer materials, in particular fluorine-free ionomer materials, such as doped sulfonated polyether ketones or doped sulfonated or sulfinated aryl ketones as well as doped polybenzimidazoles can also be used. Composite membranes, reinforced membranes, ceramic membranes and multilayer membrane materials can also be used.

In another preferred embodiment, the electrolytic cell is characterized in that the polymer membrane consists of an anion-conductive polymer, for example hexamethyl-p-terphenyl poly(benzimidazolium), and the electrolytic cell is configured for alkaline electrolysis.

In the prior art, anion-conductive polymer membranes for alkaline electrolysis are known and are also referred to as anion exchange membrane AEM or, more precisely, anion exchange membrane for water electrolysis AEMWE.

For example, polysulfone (PSF)-based AEMs, polyphenylene oxide (PPO)-based AEMs, or polybenzimidazole-based AEMs are known and can be used in an electrolytic cell (see Cho et al. A Review on Membranes and Catalysts for Anion Exchange Membrane Water Electrolysis Single Cells, J. Electrochem. Sci. Technol., 2017, 8(3), 183-196).

In a preferred embodiment of the invention, electrolytic cell is characterized in that the layer system comprises the following layers:
  a cathode-side transport layer
  a first (cathode-side) catalytically active layer
  a polymer membrane
  a second (anode-side) catalytically active layer and
  an anode-side transport layer
  wherein an intermediate layer comprising electrically conductive, preferably ceramic or metallic, nanofibers is present between the first catalytically active layer and the cathode-side transport layer and/or between the second catalytically active layer and the anode-side transport layer.

Here, it is particularly preferred that the intermediate layer is formed by nanofibers based on compounds containing iridium oxide, in particular IrOx, IrRuOx and/or IrNiOx nanofibers. Preferably, the intermediate layer is present on the anode side.

Alternatively, it may be preferred that a catalytically active layer, preferably an anode side catalytically active layer comprises catalytically active nanoparticles and nanofibers preferably each based on compounds containing iridium oxide, particularly preferably IrOx, IrRuOx and/or IrNiOx compounds.

In preferred embodiments of the invention, the electrolytic cell is arranged as multiple cells or a stack.

Thus, the invention also relates to an electrolytic cell stack comprising a plurality of the described electrolytic cells which are stacked one above the other and/or side by side. Bipolar plates can preferably be arranged between the individual electrolytic cells. Connectivity can be effected via end plates, such that the bipolar plates serve as flow fields.

A plurality of electrolytic cells for a stack preferably means at least three, more preferably at least 5, 10, 20, 50, 100, 150, 200, 300 or more electrolytic cells.

The invention further relates to a use of an electrolytic cell or electrolytic cell stack described for the production of hydrogen and oxygen from water while providing electrical energy.

In another aspect, the invention further relates to a method of manufacturing an electrolytic cell comprising the following steps
  a. Provision of a polymer membrane
  b. Applying a pair of catalytically active layers comprising the polymer membrane, the pair of catalytically active layers preferably comprising catalytically active nanoparticles
  c. Provision of an anode-side transport layer and/or a cathode-side transport layer,
  characterized in that the method comprises providing electrically conductive nanofibers, preferably metallic or ceramic nanofibers for increasing in-plane conductivity or improving connectivity of the catalytically active nanoparticles, the electrically conductive nanofibers being applied as an additional intermediate layer to one or both catalytically active layers, the application of a catalytically active layer comprising an application of a mixture of catalytically active nanoparticles and electrically conductive nanofibers and/or the application of an anode-side or cathode-side transport layer comprising an application of nanofibers.

Preferably, the process is carried out in the order mentioned. That is, firstly a polymer membrane is prepared and subsequently the catalytically active layers, possibly an intermediate layer of nanofibers, are applied and then joined together with the anode-side and cathode-side transport layers in an electrolytic cell or in a cell stack.

However, it may be preferable to choose a different order of manufacture.

In a further aspect, the invention thus relates to a method of manufacturing an electrolytic cell comprising the following steps a. Provision of an anode-side transport layer or a cathode-side transport layer
b. Application of a catalytically active layer to the anode-side or cathode-side transport layer, preferably the pair of catalytically active layers comprising catalytically active nanoparticles
c. Application of a polymer membrane to the catalytically active layer, characterized in that the method comprises providing electrically conductive nanofibers, preferably metallic or ceramic nanofibers for increasing in-plane conductivity or improving a connectivity of the catalytically active nanoparticles as an additional intermediate layer on the transport layer, the application of the catalytically active layer comprises applying a mixture of catalytically active nanoparticles and electrically conductive nanofibers, and/or the provision of an anode-side transport layer or a cathode-side transport layer comprises providing a transport layer comprising electrically conductive nanofibers.

Thus, for said process, the fabrication of the electrolytic cell preferably starts with a transport layer onto which an intermediate layer of nanofibers, a catalytically active layer and a polymer membrane are applied, as appropriate. A person skilled in the art will recognize that the method can be equally started from an anode-side or cathode-side transport layer and is preferably continued accordingly to complete the cathode-side or anode-side layer structure, so that an electrolytic cell with two transport layers or two catalytically active layers is obtained.

A person skilled in the art will recognize that preferred embodiments and advantages disclosed in connection with the electrolytic cell are equally applicable to the claimed stack and to the use of the electrolytic cell or method of manufacturing the same.

In a preferred embodiment of the method, the nanofibers are provided by a spinning process, preferably an electrospinning process, a centrifugal spinning process, and/or a solution-blow spinning process.

In another preferred embodiment of the method, the application of a layer comprising the nanofibers is performed by means of spraying, thermal spraying, preferably a plasma spraying or vacuum plasma spraying, spray coating, slot die, roll-to-roll equipment, doctoring and/or drop casting.

In a particularly preferred embodiment, the metallic or ceramic nanofibers are produced as a coherent network of nanofibers by means of a spinning process, thermally post-treated (calcinated), comminuted as a dispersion for further processing and subsequently applied by means of a coating process, preferably by means of spray coating. Particularly preferably, the nanofibers exhibit a diameter of less than 1000 nm and a length of less than 20 µm, preferably less than 10 µm, and are applied in a coating process, preferably as a dispersion together with a binding polymer.

The terms "comprise" and "include" or grammatical variants are to be understood as specifying the characteristics indicated, but do not exclude the addition of one or more additional characteristics. These terms include the terms "consisting of" and "consisting substantially of". Thus, the terms "comprising"/"including"/"containing" mean that any additional component may be present. The term "consisting of" preferably means that no further component is present. However, the term "consisting substantially of" or grammatical variants thereof, does not in principle preclude the addition of one or more additional features, but only if the additional features do not substantially change the basic and novel characteristics of the claimed apparatus or method.

DETAILED DESCRIPTION

The invention will be explained below with reference to further figures and examples. The examples and figures serve to illustrate preferred embodiments of the invention without limiting them.

DESCRIPTION OF THE ILLUSTRATIONS

FIG. 1 Schematic illustration of the structure and function of an electrolytic cell: Left: acid electrolysis, right: alkaline electrolysis FIG. 2 Electron pathways from the porous transport layer to the catalyst layer in a PEM water electrolytic cell. At high catalyst loading, in-plane electron transport is enabled by a comparatively thick catalytic layer (CL, left). The catalytic layer consists substantially of catalytically active nanoparticles. At low loading with catalytically active material, the in-plane electrical resistance increases and some parts of the catalytic layer (CL) lose electrical connection, reducing the active surface area (middle). For example, clusters of nanoparticles may form which are no longer in contact with the transport layer. In a preferred embodiment of the invention, an intermediate layer with nanofibers is incorporated to increase the in-plane conductivity and to connect the entire catalytic layer (CL) (right).

FIG. 3 Different configuration (1 to 3) for the preferred use of the electrically conductive nanofibers in a layer system of an electrolytic cell. Configuration 1 illustrates a preferred embodiment in which the electrically conductive nanofibers form an intermediate layer between a catalytically active layer and a transport layer. Configuration 2 illustrates a preferred embodiment in which a transport layer comprises electrically conductive nanofibers. The schematic view illustrates a particularly preferred embodiment in which the transport layer consists substantially of nanofibers. Configuration 3 illustrates a preferred embodiment in which one of the catalytically active layers comprises a mixture of catalytically active nanoparticles and nanofibers.

FIG. 4A: Scanning electron microscopy images of the PVA/iridium(III) chloride nanofibers, B: Scanning electron microscopy images of the iridium(IV) oxide nanofibers.

Figure 5:
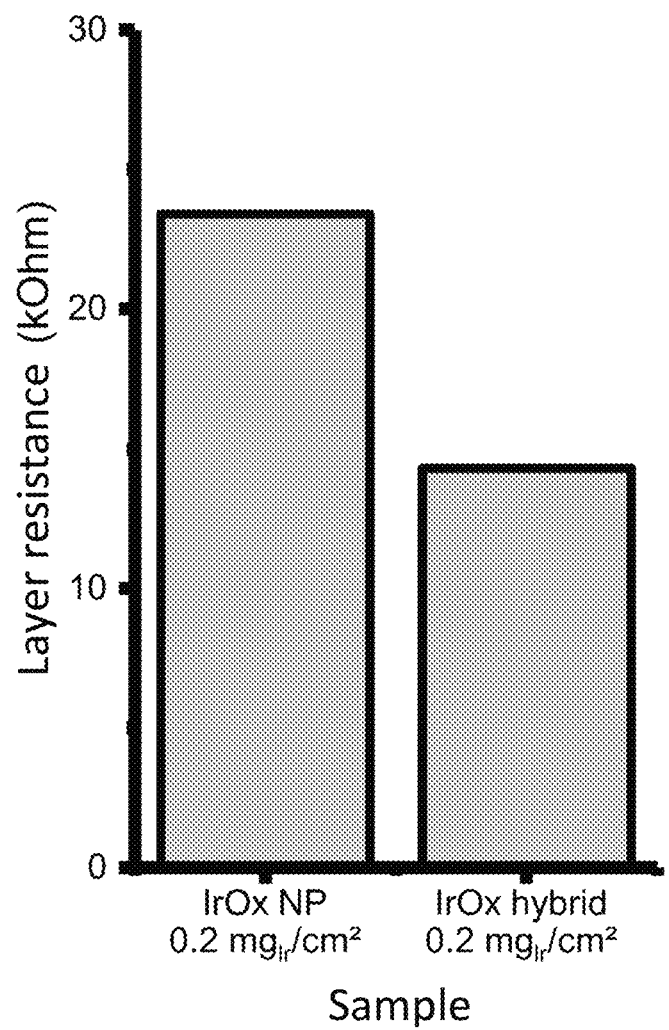

FIG. 5 Sheet resistance of a sample of IrOx nanoparticles compared to a sample with an intermediate layer of IrOx nanofibers on IrOx nanoparticles measured in ambient air.

Figure 6:
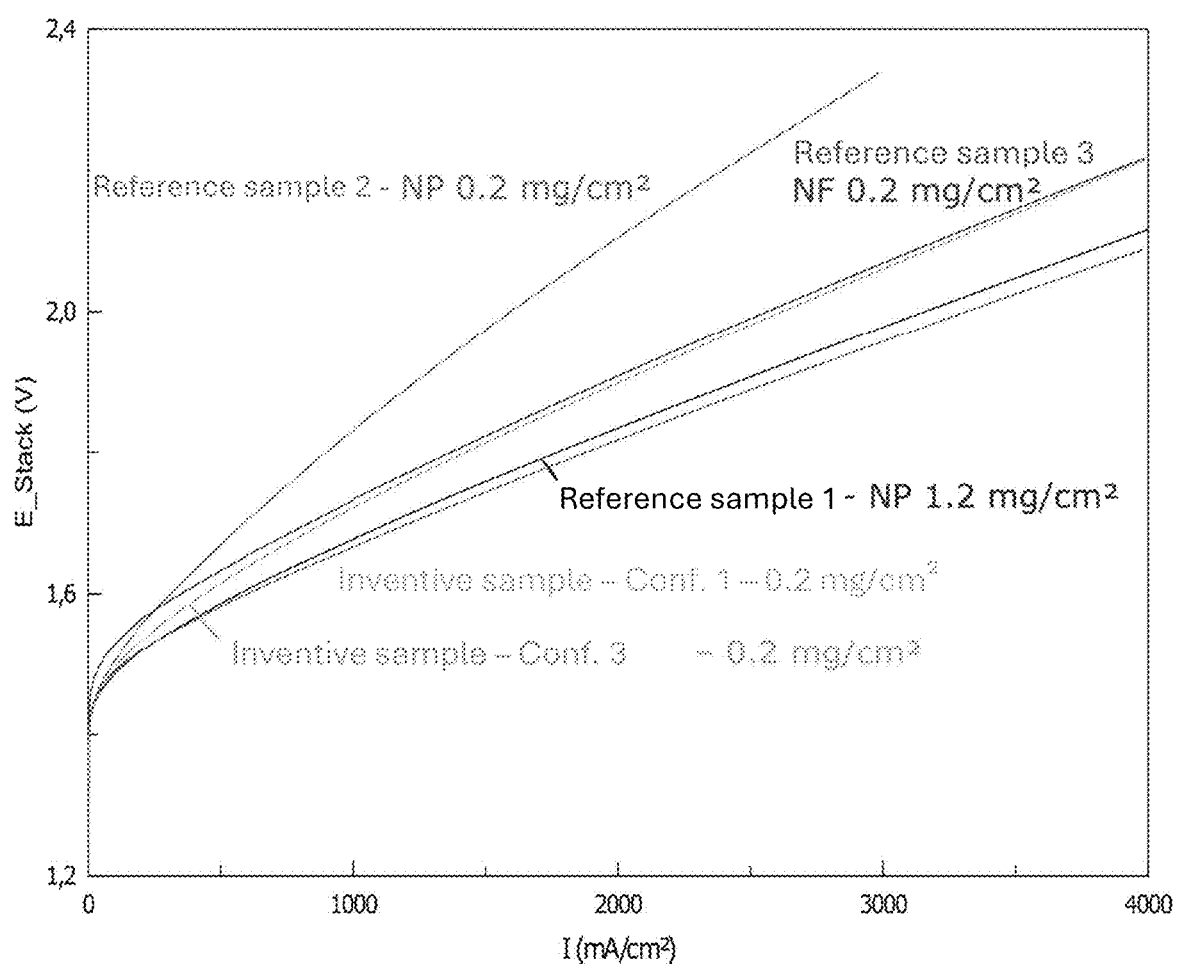

FIG. 6 Measurement graph 1: Measurement results for a voltage-current density curve of the inventive electrolytic cells compared to the reference electrolytic cells.

Figure 7:
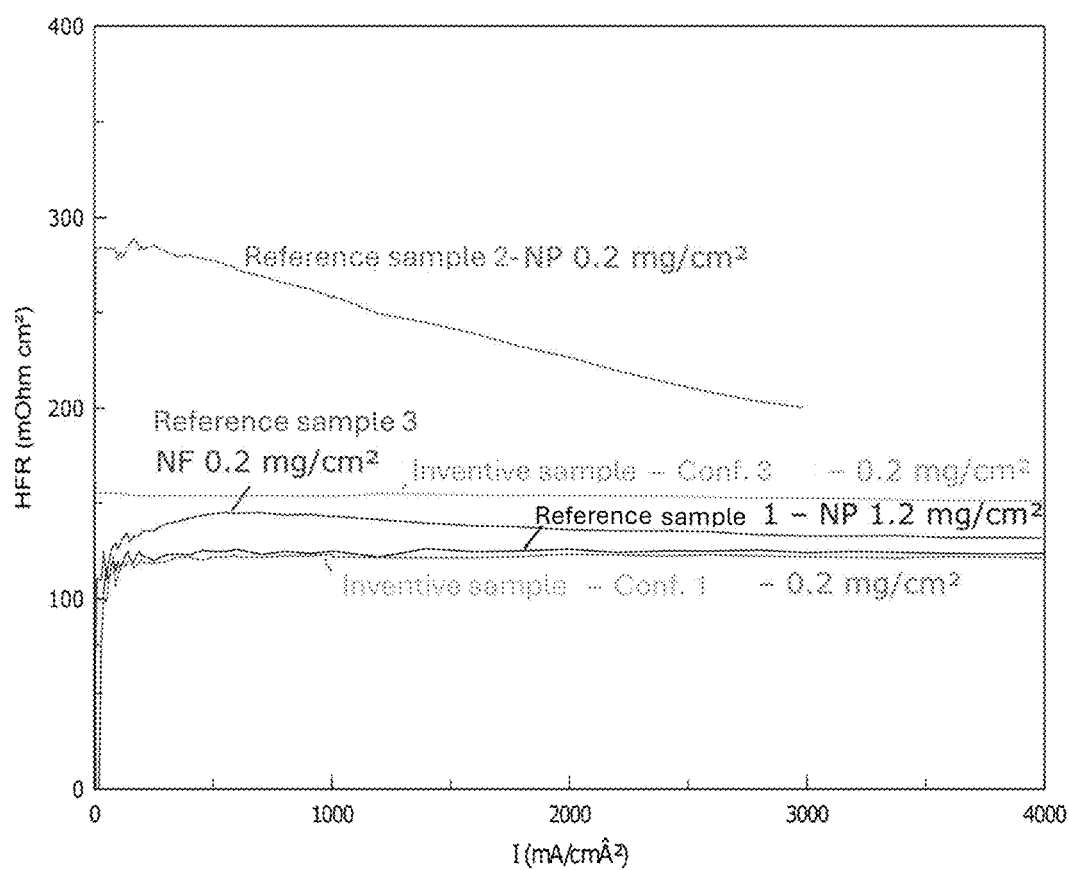

FIG. 7 Measurement graph 2: Measurement results for a resistance-current density curve of the inventive electrolytic cells compared to the reference electrolytic cells.

Figure 8:
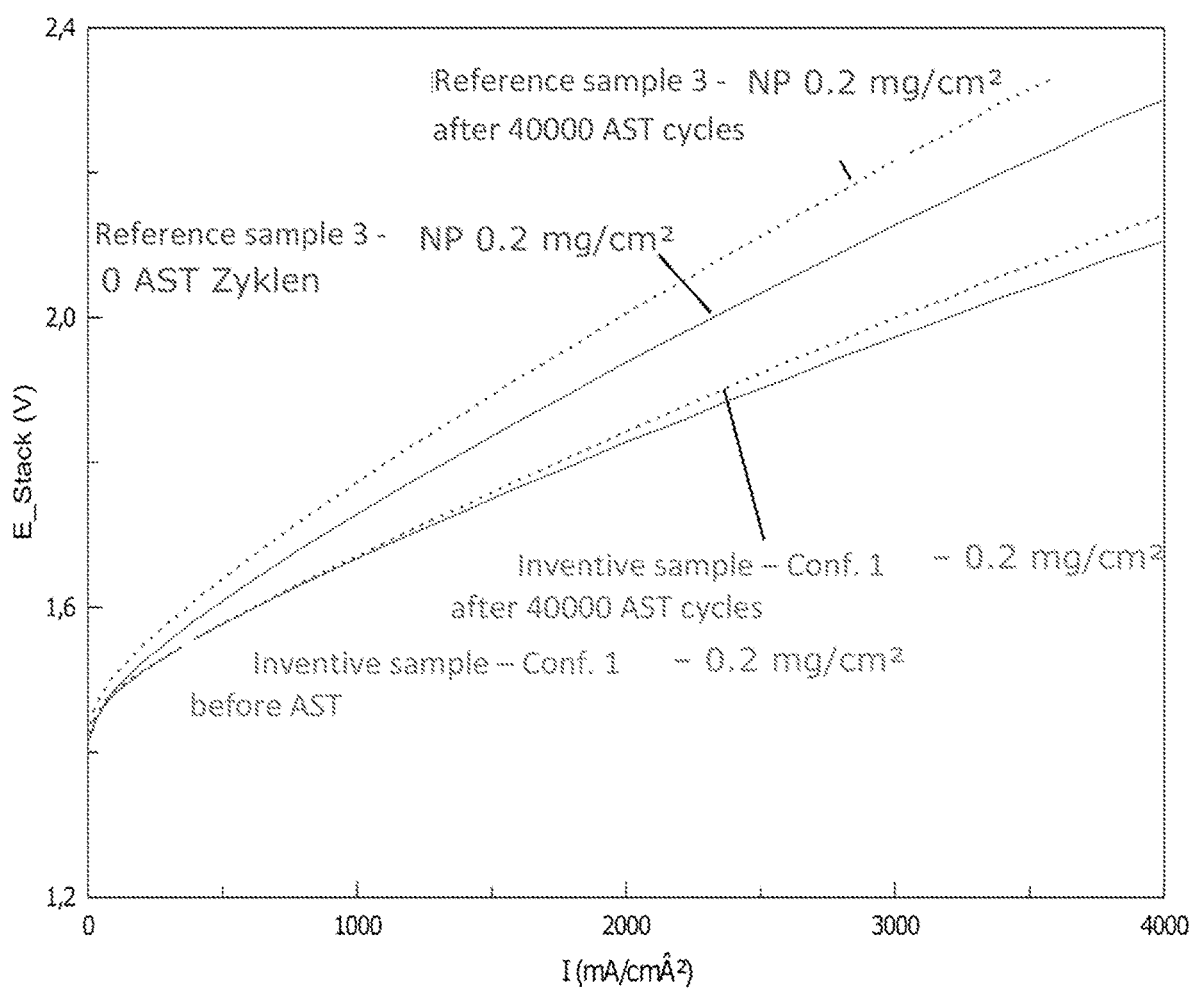

FIG. 8 Measurement graph 3: Measurement results for a resistance-current density curve of the inventive electrolytic cells compared to reference electrolytic cells before and after aging by accelerated stress tests.

EXAMPLE

Use of Iridium(IV) Oxide Nanofibers as an Additional Intermediate Layer (Configuration 1) and Use of a Mixture of Iridium(IV) Oxide Nanofibers and Iridium(IV) Oxide Nanoparticles as a Catalyst Layer (Configuration 3)

In the following, an experiment is described for configuration 1 of FIG. 3, where iridium(IV) oxide nanofibers are applied as an additional intermediate layer on top of a catalytically active layer of nanoparticles. Here, commercially available iridium(IV) oxide particles were sprayed on the anode side of a commercially available half CCM (Pt/C cathode on N115 membrane) by spray coating. In a second step, IrOx nanofibers were sprayed on. The membrane electrode assembly (MEA), prepared in this manner, was subsequently electrochemically characterized in an electrolysis stand and compared to conventionally constructed MEAs with the same and significantly higher IrOx loading. The same configuration can also be applied to even more active material systems (e.g. IrRuOx, IrNiOx, etc.) to further enhance the performance. However, since the experiment is initially intended to demonstrate only the performance advantage due to the modified structure, IrOx was used as a proven catalyst material.

Preparation of Iridium(IV) Oxide Nanofibers

Polyvinyl alcohol (PVA; $M_w$>80,000 g/mol; 10.0 wt %) and iridium(III) chloride hydrate (3.0 wt %) were stirred in N,N-dimethylacetamide for 24 h at 100° C. The electrospinning process was carried out in a controlled environment of 30% relative humidity and a temperature of 30° C. The distance between the nozzle and the collecting or counter electrode was 15 cm with an applied voltage of 15 kV. The PVA/IrCl$_3$ solution was injected into the electric field at a flow rate of 100 μl/h through a nozzle with a diameter of 0.6 mm. The nanofibers were deposited on a PTFE film from which the nanofiber mat could be detached using tweezers after successful fabrication of the nanofibers.

FIG. 4A shows a scanning electron micrograph of the PVA/iridium(III) chloride nanofibers.

The PVA/iridium(III) chloride nanofibers were thermally posttreated in air for 4 h in an oven at 350-500° C. (heating rate 1.3 K/min). In this process, both the PVA carrier polymer was oxidized to volatile products (mainly $CO_2$ and $H_2O$) and iridium(III) chloride was oxidized to iridium(IV) oxide.

FIG. 4B shows a scanning electron microscopy of the iridium(IV) oxide nanofibers obtained in this manner.

Manufacture of the Membrane Electrode Assembly (MEA)

Five electrolytic cells were fabricated, two references comprising a catalytically active layer with nanoparticles on the anode side as is common in the prior art:

Reference sample 1—NP 1.2 mg/cm$^2$ with catalyst loading of 1.2 mg/cm$^2$ IrO$_x$ (black)

Reference sample 2—NP 0.2 mg/cm$^2$ with catalyst loading of 0.2 mg/cm$^2$ IrO$_x$ (red)

In addition, as a further reference, a membrane electrode assembly was fabricated using only IrOx nanofibers as the catalyst material in the anode.

Reference sample 3—NF 0.2 mg/cm$^2$ with catalyst loading of 0.2 mg/cm$^2$ IrOx (blue)

Moreover, an electrolytic cell according to configuration 1 of the invention was fabricated comprising, in addition to a catalytically active layer comprising nanoparticles, an intermediate layer comprising IrOx nanofibers:

Inventive sample—Conf 1—0.2 mg/cm$^2$ with catalyst loading of 0.2 mg/cm$^2$ IrO$_x$ (blue)

Lastly, an electrolytic cell according to configuration 3 of the invention was fabricated comprising a mixture of IrO$_x$ nanoparticles and IrOx nanofibers in the catalytically active layer:

Inventive sample—Conf 3—0.2 mg/cm$^2$ with catalyst loading of 0.2 mg/cm$^2$ IrO$_x$ (olive)

First, a dispersion containing 1% iridium(IV) oxide, 0.4% Nafion D520 dispersion, 49.3% isopropanol and 49.3% (both percentages by mass) deionized water was prepared. The dispersions were treated in an ultrasonic bath for 30 min immediately before spray coating.

To prepare the MEAs, the dispersion was sprayed by spray coating on the anode side on 5 cm$^2$ with 0.5 mg/cm$^2$ Pt/C cathode and N115 membrane. For Reference Sample 1—NP 1.2 mg/cm$^2$, 1.2 mg/cm$^2$ IrO$_x$ was sprayed as nanoparticles, for Reference Sample 2—NP 0.2 mg/cm$^2$, 0.2 mg/cm$^2$ IrO$_x$ was sprayed as nanoparticles and for Inventive Sample—Conf 1—0.2 mg/cm$^2$, only 0.1 mg/cm$^2$ IrO$_x$ was sprayed as nanoparticles in this step. For the Reference Sample 3—NF 0.2 mg/cm$^2$ no IrO$_x$ nanoparticles were sprayed onto the membrane.

For the Inventive Sample—Conf 1—0.2 mg/cm$^2$ and Reference Sample 3—NF 0.2 mg/cm$^2$, a further dispersion containing 1% previously prepared iridium(IV) oxide nanofibers, 0.4% Nafion D520 dispersion, 49.3% isopropanol and 49.3% (respectively percentages by mass) deionized water was prepared and treated in an ultrasonic bath for 30 min immediately prior to spray coating. The dispersion was subsequently spray coated onto the pre-existing anode with 0.1 mg/cm$^2$ IrO$_x$ in the case of Inventive Sample—Conf 1—0.2 mg/cm$^2$, resulting in a total loading of 0.2 mg/cm$^2$ IrO$_x$. In the case of Reference Sample 3—NF 0.2 mg/cm$^2$, a total of 0.2 mg/cm$^2$ IrO$_x$ nanofibers was applied in a single spray. For the Inventive Sample—Conf 3—0.2 mg/cm$^2$, a dispersion containing 0.5% iridium(IV) oxide nanoparticles, 0.5% iridium(IV) oxide nanofibers, 0.4% Nafion D520 dispersion, 49.3% isopropanol, and 49.3% (respectively percentages by mass) deionized water was prepared. A total of 0.2 mg/cm$^2$ of the dispersion was sprayed to prepare the MEA. All loadings refer to the pure precious metal.

The MEAs lay on a plate heated to 90° C. during the spraying process. This causes isopropanol and water to evaporate between the individual passes, creating a porous layer of IrOx and Nafion.

Measurement of Layer Resistance

To determine the extent to which the provision of nanofibers can increase the in-plane conductivity of a layer of nanoparticles, the in-plane resistivity for catalyst layers of IrOx nanoparticles was determined in comparison to a combination of IrOx nanoparticles with IrOx nanofibers. The layer resistance of the catalyst layers was measured by a transfer line method using a similar setup as explained in more detail in Ahadi et al. 2019 (Ahadi, M.; Tam, M.; Stumper, J.; Bahrami, M. Electronic conductivity of catalyst layers of polymer electrolyte membrane fuel cells: Through-plane vs. in-plane. International Journal of Hydrogen Energy 2019, 44, 3603-3614.22).

The catalyst layers for the measurement of layer resistance were prepared with a width of 1 cm by spray coating on an insulating glass substrate. For a reference sample (IrOx NP, 0.2 mg$_{IR}$/cm$^2$), only IrOx nanoparticles with a loading of 0.2 mg$_{IR}$/cm$^2$ were applied to the insulating glass substrate. In one inventive sample, an intermediate layer of IrOx nanofibers was deposited in addition to a layer of IrOx nanoparticles (IrOx hybrid, 0.2 mg$_{IR}$/cm$^2$). Then, carbon paper with a microporous layer (MPL) (Freudenberg H24C5) and a width of 5 mm was pressed onto the film with 0.7 N, first MPL side, to electronically connect the whole width of the film. Resistance was measured for contact distances of 1, 2, 3, and 4 cm at ambient conditions (25° C., 50% RH) using a FLUKE 175 multimeter. By plotting the resistance against the distance between the measurement points and a linear fit, the layer resistance was determined from the slope. The electrical layer resistance (in plane resistivity) can thus be defined as $R_{sheet} = dR/dx \cdot w$, where R is the measured ohmic resistance, w is the width of the catalyst layer and x is the measurement distance between the contact points of the test sample.

As can be seen in FIG. 5, the layer resistance of a catalyst layer in which an intermediate layer of IrOx nanofibers is applied in addition to the IrOx nanoparticles (IrOx hybrid, 0.2 mg$_{IR}$/cm$^2$) is significantly lower than is the case for a catalyst layer consisting solely of nanoparticles (IrOx NP, 0.2 mg$_{IR}$/cm$^2$). Accordingly, the in-plane conductivity is higher when using IrOx nanofibers.

Electrochemical Characterization

All MEA tests were performed in a single cell with gold-coated titanium flowfields. A Freudenberg H24C5 (30% compression) was used on the cathode side and a Bekaert Ti fiber transport layer on the anode side. To run-in the cell, 15 polarization curves from 1.4 to 2.2 V were measured before starting the measurements. In order to estimate the lifetime of the inventive sample compared to the reference samples, accelerated stress tests (AST) were performed in addition to the polarization measurements. For this, a test protocol was used which allows the MEAs to degrade to a similar extent, by applying an AC voltage within a short period of time, as regular operation over a much longer period of time (Angewandte Chemie, International ed. in English, 56, 5994-6021, 2017). After 40000 AST cycles, polarization measurements were again taken and compared with measurements of the unaged samples.

Results: Measurement Data

The electrolytic cells with the layers produced according to configuration 1 ("Electrolytic cell Conf-1") and configuration 3 ("Electrolytic cell Conf-3") are now compared with electrolytic cells according to the prior art ("Reference Samples 1-3"). In the graph, the Y-axis denotes the voltage in V (E_Stack) and the X-axis denotes the current density or current per area in mA/cm$^2$ (I). The hydrogen production rate is proportional to the current density, i.e. the higher the current density, the more hydrogen is produced. The lower the voltage at the same current density, the more efficient the electrolytic cell, since the energy to be used per quantity of hydrogen produced is directly proportional to the voltage.

From measurement graph 1 of the voltage-current density curve (FIG. 6), it can be concluded:
1. Reference sample 2—NP 0.2 mg/cm$^2$ has a higher cell voltage (and thus a lower conversion efficiency) than reference sample 1—NP 1.2 mg/cm$^2$. This is to be expected as the catalyst loading was significantly reduced.
2. Reference sample 3—NF 0.2 mg/cm$^2$, has a lower cell voltage than reference sample 2—NP 0.2 mg/cm$^2$ due to the better connection of the catalyst material at higher current densities. At low current densities, however, the disadvantage of lower catalyst activity becomes apparent in comparison with reference sample 2—NP 0.2 mg/cm$^2$. Here the overvoltage of reference sample 3—NF 0.2 mg/cm$^2$ is lower than that of reference sample 2—NP 0.2 mg/cm$^2$.
3. The electrolytic cell conf-1-0.2, on the other hand, combines the advantages of nanoparticles and nanofibers and, despite low catalyst loading, has a comparable voltage to reference sample 1—NP 1.2 mg/cm$^2$ with 6 times the catalyst loading.
4. The electrolytic cell conf-3-0.2, similarly combines the advantages of nanoparticles and nanofibers but has a higher voltage than the electrolytic cell conf-1-0.2 in this test.

In another measurement graph (FIG. 7), the high frequency resistance (HFR) is plotted against the current density. The high frequency resistance was determined by in-situ impedance measurements at 1 kHz during the polarization measurement. The HFR includes both ionic and electrical resistances in the cell. For the same electrolytic cells, it can be concluded from the graph:
1. Reference sample 2—NP 0.2 mg/cm$^2$ has a higher HFR than reference sample 1—NP 1.2 mg/cm$^2$. This is to be expected as the catalyst loading was significantly reduced.
2. The electrolytic cell-NF-0.2, has a significantly lower HFR than reference sample 2—NP 0.2 mg/cm$^2$.
3. The electrolytic cell Conf-1-0.2, despite low catalyst loading, has a very low HFR, which is comparable to the reference sample 1—NP 1.2 mg/cm$^2$ with 6-fold catalyst loading.
4. The electrolytic cell conf-3-0.2, achieves a significantly lower HFR than the equally loaded prior art reference cell (reference sample 2—NP 0.2 mg/cm$^2$). However, the HFR is higher than the HFR of the electrolytic cell conf-1-0.2, the highly loaded reference sample 1—NP 1.2 mg/cm$^2$ and slightly higher than the HFR of the low loaded pure nanofiber layer.

In another measurement graph (FIG. 8), the polarization curves of reference sample 2—NP 0.2 mg/cm$^2$ and the inventive electrolytic cell conf-1-0.2 are compared before and after aging by accelerated stress test (AST). After 40000 ASTs, the overpotential of the electrolytic cell conf-1-0.2 is significantly less increased than the overpotential of reference sample 2—NP 0.2 mg/cm$^2$. Thus, the performance of the electrolytic cell conf-1-0.2 is better preserved. The lower overpotential indicates an increased lifetime of the inventive sample compared to the reference samples.

Overall, the measurements show that by using nanofibers, especially in configurations 1 and 3, the catalyst loading can be significantly reduced without increasing the cell voltage or the HFR. This means that by using nanofibers, for example as an intermediate layer or a mixture of nanofibers and nanoparticles, catalyst material can be saved and the performance of the cell can be improved at the same time. The results of the accelerated stress tests indicate an increased service life of the inventive electrolytic cells.

REFERENCE LIST

4 Cathode-side transport layer
5 Catalytically active layer (cathode side)
7 Polymer membrane
9 Catalytically active layer (anode side)
11 Anode-side transport layer
13 Nanofibers
15 Nanoparticles

The invention claimed is:
1. An electrolytic cell for generating hydrogen and oxygen with a layer system comprising at least one pair of catalytically active layers between which a polymer membrane is arranged, wherein the layer system comprises the following layers:
a pair of catalytically active layers to form an anode and a cathode, and
an anode-side transport layer and/or a cathode-side transport layer,
wherein the pair of catalytically active layers comprises catalytically active nanoparticles and wherein to improve connectivity of the catalytically active nanoparticles an intermediate layer comprising conductive nanofibers is present between one of the catalytically active layers and a transport layer, wherein the conductive nanofibers are based on compounds containing iridium oxide, wherein the nanoparticles exhibit a maximum dimension of 1 nm-1000 nm and a sphericity of more than 0.5, and the conductive nanofibers exhibit a diameter of 10 nm-1000 nm and an aspect ratio of 5-1000, and wherein the conductive nanofibers are produced as a coherent network of nanofibers by means of a spinning process, thermally post-treated, comminuted as a dispersion for further processing and subsequently incorporated as a dispersion into the layer system by means of a coating process.

2. Electrolytic cell according to claim 1, wherein the conductive nanofibers exhibit a diameter of 50 nm-400 nm and/or the conductive nanofibers exhibit an aspect ratio of 5-250.

3. Electrolytic cell according to claim 1, wherein the nanoparticles exhibit a sphericity of more 0.7.

4. Electrolytic cell according to claim 1, wherein the conductive nanofibers exhibit a diameter of less than 1000 nm and a length of less than 20 µm and have been applied in a coating process.

5. Electrolytic cell according to claim 1, wherein the conductive nanofibers are formed from a catalytically active material or are formed from a non-catalytically active material and are coated with a catalytically active material.

6. Electrolytic cell according to claim 1, wherein the polymer membrane consists of a proton-conductive polymer, and the electrolytic cell is configured for acid electrolysis, or the polymer membrane consists of an anion-conductive polymer, and the electrolytic cell is configured for alkaline electrolysis.

7. Electrolytic cell according to claim 1, wherein the electrolytic cell is an acidic electrolytic cell with a proton-conductive polymer membrane and the conductive nanofibers consist of a catalytically active material and/or are coated with a catalytically active material.

8. Electrolytic cell according to claim 1, wherein the electrolytic cell is an alkaline electrolytic cell having a polymer membrane permeable to hydroxide ions ($OH-$) and the conductive nanofibers consist of a catalytically active material.

9. Electrolytic cell according to claim 1, wherein the layer system comprises the following layers:
    a cathode-side transport layer,
    a first catalytically active layer,
    a polymer membrane,
    a second catalytically active layer, and
    an anode-side transport layer,
    wherein an intermediate layer comprising the conductive nanofibers is present between the first catalytically active layer and the cathode-side transport layer and/or between the second catalytically active layer and the anode-side transport layer.

10. An electrolytic cell stack comprising a plurality of electrolytic cells according to claim 1, which are stacked on top of each other and/or side by side.

11. A method of producing hydrogen and oxygen from water while providing electrical energy comprising using an electrolytic cell according to claim 1.

12. Electrolytic cell for generating hydrogen according to claim 1, wherein the proportion by weight of the conductive nanofibers to the catalytically active nanoparticles range from 0.25:1 to 2:1.

13. Electrolytic cell according to claim 1, wherein the conductive nanofibers are ceramic nanofibers.

* * * * *